United States Patent

Schnell et al.

[15] 3,692,870

[45] Sept. 19, 1972

[54] NEW POLYMERIC THERMOPLASTIC COMPOUNDS DERIVED FROM SUBSTANTIALLY LINEAR POLYCARBONATES AND PROCESS FOR THE PRODUCTION THEREOF

[72] Inventors: Hermann Schnell, Krefeld-Uerdingen, Germany; Manfred Cziesla, Washington, D.C.; Ludwig Bottenbruch, Krefeld-Bockum, Germany

[73] Assignee: Farbenfabriken Bayer Aktiengesellschaft, Leverkusen, Germany

[22] Filed: Nov. 17, 1970

[21] Appl. No.: 90,475

Related U.S. Application Data

[63] Continuation-in-part of Ser. No. 688,688, Filed Dec. 7, 1967.

[30] Foreign Application Priority Data

Dec. 10, 1966   Germany..................F 50 901

[52] U.S. Cl. .........260/861, 260/47 XA, 260/47 UA, 260/872

[51] Int. Cl..........................C08f 21/00, C08f 21/02
[58] Field of Search ....260/861, 872, 77.5 U, 47 XA, 260/47 UA

[56] References Cited

UNITED STATES PATENTS

| | | | |
|---|---|---|---|
| 3,124,554 | 3/1964 | Schnell et al. | 260/45.5 |
| 3,164,564 | 1/1965 | Butterworth et al. | 260/47 |
| 3,320,211 | 5/1967 | Bissinger et al. | 260/47 |
| 3,355,414 | 11/1967 | Caldwell et al. | 260/33.8 |

*Primary Examiner*—William H. Short
*Assistant Examiner*—Earl A. Nielsen
*Attorney*—Robert A. Gerlach

[57] ABSTRACT

New polymeric thermoplastic compounds having favorable properties are obtained by reacting substantially linear polycarbonates containing polymerizable unsaturated groups dissolved in inert solvents or dispersed in nonsolvents with radical-polymerizable olefins or derivatives thereof or mixtures thereof under polymerization conditions.

22 Claims, No Drawings

NEW POLYMERIC THERMOPLASTIC COMPOUNDS DERIVED FROM SUBSTANTIALLY LINEAR POLYCARBONATES AND PROCESS FOR THE PRODUCTION THEREOF

This application is a continuation-in-part application of copending application Ser. No. 688 688, filed Dec. 7, 1967.

High molecular weight thermoplastic, substantially linear polycarbonates are well known in the art. Particular polycarbonates derived from dihydric phenols, especially bisphenols, are highly valuable plastics due to their excellent properties.

A special group of substantially linear polycarbonates containing polymerizable unsaturated groups, particularly β-alkenyl groups, which may be copolymerized with radical-polymerizable olefinically unsaturated monomers yielding cross-linked, infusible and insoluble products are also known and described, for example, in U.S. Pat. 3,124,554.

It is an object of the present invention to provide new polymeric thermoplastic compounds derived from substantially linear polycarbonates having favorable properties.

It is a further object of this invention to provide new polymeric thermoplastic compounds derived from substantially linear polycarbonates containing polymerizable unsaturated groups. It is still another object of this invention to provide new polymeric thermoplastic compounds derived from substantially linear polycarbonates containing polymerizable unsaturated groups and polymers of olefins or olefin derivatives or mixtures thereof grafted to said polymerizable unsaturated groups of the polycarbonates.

It is further an object of this invention to provide a process for the production of the new polymeric thermoplastic compounds mentioned above.

This process comprises, generally speaking, reacting substantially linear polycarbonates having polymerizable unsaturated groups dissolved in inert solvents or dispersed in nonsolvents with radical-polymerizable monomeric olefins or derivatives thereof or mixtures thereof under polymerization conditions.

The reaction may be carried out in homogeneous phase by dissolving the polycarbonate containing polymerizable unsaturated groups in an inert solvent and adding to the solution a radical-polymerizable monomeric olefin or derivatives thereof or mixtures thereof forming homogeneous solution and initiating the graft polymerization, for example, by heating or by irradiation with effective rays or by adding radical-forming catalyst. The polymerized product may then be precipitated by adding a nonsolvent for the polymeric product, miscible with the solvent of the solution. The polymeric product may also be separated by evaporating the solvent or by other methods known in the art for separating polymeric compounds from their solutions.

The graft polymerization may also be carried out in heterogenous phase by mixing the solution of the polycarbonate in an inert organic solvent with another liquid immiscible with the polycarbonate solution, preferably water, and adding a radical-forming polymerization catalyst and the olefin or the derivative thereof, optionally after having removed the organic solvent.

While the reaction of polycarbonates containing polymerizable unsaturated groups with radical-polymerizable monomeric olefins or derivatives thereof under polymerization conditions in the absence of diluents as described in the U.S. Pat. No. 3,124,554 yield cross-linked, infusible and insoluble copolymers, the reaction of said polycarbonates with said monomeric olefins in the presence of diluents according to the invention, surprisingly, leads to the formation of the corresponding branched graft polymers rather than of cross-linked copolymers. These graft polymers are thermoplastic compounds, soluble in a number of organic solvents.

Thermoset, cross-linked copolymers e.g. such disclosed by Schnell et al. in the U.S. Pat. No. 3 124 554 differ from thermoplastic compounds e.g. those of the present invention by lack of any remarkable solubility for instance in methylene chloride.

Generally they have a solubility at a temperature of 25° C which is less than 1 g in 100 ml methylene chloride whereas the claimed soluble polymer has a solubility at a temperature of 25° C which is higher than 10 g in 100 g methylene chloride.

Polycarbonates containing unsaturated groups are, for example, those prepared in known manner with the use of aromatic dihydroxy compounds which are mono- or polysubstituted on the aromatic nuclei by alkenyl, for example, with the use of mono- and diallyl-hydroquinone, 3-mono- and 3,3'-diallyl-4,4'-dihydroxydiphenyl, 3-mono- and 3,3'-diallyl-4,4'-dihydroxydiphenyl-sulphone, and particularly of 3-mono- and 3,3'-diallyl compounds of 4,4'-dihydroxydiphenylalkanes, e. g. 4,4'-dihydroxydiphenyl-methane, 1,1-(4,4'-dihydroxydiphenyl)-ethane, 2,2-(4,4'-di-hydroxydiphenyl)-propane, 2,2-(4,4'-dihydroxydiphenyl)-butane, 1,1-(4,4'-dihydroxydiphenyl)-cyclopentane and 1,1-(4,4'-dihydroxydiphenyl)-cyclohexane, and also of the corresponding methallyl and crotonyl compounds, as are described, for example, in the U.S. Pat. No. 3,134,554.

Instead of dihydric phenols the nuclei of which are substituted by b-alkenyl groups there may be also used dihydric phenols the nuclei of which are substituted by, for example, allyl, methallyl or crotonyl carboxylates, such as, for example the allyl; methallyl or crotonyl esters of hydroquinone-3-carboxylic acid; the allyl, methallyl or crotonyl esters of hydroquinone-5-carboxylic acid; the allyl, methallyl or crotonyl esters of hydroquinone-3,5-dicarboxylic acid; the allyl, methallyl or crotonyl esters of 4,4'-dihydroxyldiphenyl-3,3'-dicarboxylic acid; the allyl, methallyl or crotonyl esters of 4,4'-dihydroxydiphenyl-5,5'-dicarboxylic acid; the allyl methallyl or crotonyl esters of 4,4'-dihydroxydiphenyl-3,3'-5,5'-tetracarboxylic acid and the corresponding allyl, methallyl or crotonyl esters of dicarboxylic or tetracarboxylic bisphenols corresponding to those bisphenols mentioned above.

Other aromatic dihydroxy compounds which can be added in the synthesis of the polycarbonates and which contain unsaturated groups are compounds of the type

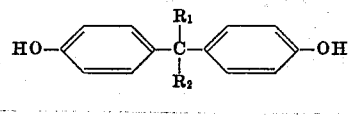

in which $R_1$ denotes hydrogen or a saturated aliphatic radical with up to 10 carbon atoms, and $R_2$ is an aliphatic radical with three to 10 carbon atoms, which contains at least one double bond. Examples of compounds of this type are the vinyl, the allyl and the methallyl esters of the 1,1-bis-(4-hydroxyphenyl)-acetic acid, of the 4,4-bis-(4-hydroxyphenyl-butyric acid and of the 4,4-bis-(4-hydroxyphenyl)-valeric acid. Other suitable compounds of this kind are mentioned, for example, in U.S. Pat. No. 3,164,564.

Suitable aliphatic dihydroxy compounds containing unsaturated groups are those with at least four and not more than 16 carbon atoms, which contain, in addition to two hydroxyl groups, at least one double bond, for example, butene-2-diol-1,4 and butene-1-diol-3,4.

Dihydroxy compounds which can be used besides the aforesaid dihydroxy compounds containing unsaturated groups to form polycarbonates, are aromatic and/or aliphatic dihydroxy compounds which are free from polymerizable unsaturated groups, for example, hydroquinone, resorcinol, dihydroxydiphenyl, dihydroxy-diarylalkanes, -cycloalkanes, -sulphones, -sulphoxides and -ethers, and aliphatic and/or cycloaliphatic dihydroxy compounds.

The molecular weight of the polycarbonates is preferably comprises between about 5,000 and about 100,000 in particular, between about 10,000 and about 70,000.

Suitable polymerizable vinyl monomers are, for example, styrene and a-methylstyrene as well as their nuclear-substituted derivatives; acrylic compounds, such as acrylic acid, acrylonitrile, acrylamide, acrylic acid esters, methacrylic acid and its esters; vinyl compounds, such as vinyl acetate and vinyl chloride; mono-olefins, such as ethylene and propylene, isobutylene; and diolefins, such as butadiene and isoprene; and also mixtures of these compounds. Other compounds of this kind are mentioned in the U.S. Pat. No. 3,225,119.

It is possible to produce final products with the most varied properties by the selection of the starting polycarbonates in respect of their molecular weight, the components used for their synthesis, and, in particular, the number of polymerizable unsaturated groups contained in them, on the one hand, and by the selection of the polymers grafted on to these polycarbonates in respect of the type and amount, on the other hand. There are preferably used starting polycarbonates with radicals of less than 50 mol per cent, in particular, less than 15 mol per cent of dihydroxy compounds containing unsaturated groups, referred to the total of radicals of dihydroxy compounds, while the grafting conditions are expediently so chosen that the average molecular weight of a grafted polymer chain is comprised between about 1,000 and 100,000, in particular, between about 5,000 and 50,000.

The production of the graft polymers can be carried out with the use of customary polymerization initiator, such as peroxides, azo compounds and redox catalysts, and/or by the action of energy-rich rays, in solution or dispersion, optionally with the addition of further polymerization auxiliaries, such as accelerators, chain transferers, molecular weight regulators, emulsifiers and buffer substances.

Suitable solvents which may be used for carrying out the process are such known as solvents for linear polycarbonates, for example, chlorinated lower aliphatic hydrocarbons including methylene chloride, ethylene chloride and chloroform, chlorinated aromatic hydrocarbons including mono-and dichlorobenzene, furthermore dioxane, anisole etc.

The new products are characterized by improved processing properties, lower processing temperature, improved stability, some also by improved stability to chemicals, and they can be used, optionally with the addition of dyestuffs, pigments, fillers and plasticizers, by known methods, thermoplastically or from plastically or from solutions, for compression or injection moldings, films, fibers, coatings and lacquers.

The parts given in the following Examples are parts by weight. The relative viscosities were measured on solutions of 0.5 g. of the substance in 100 ml. methylene chloride at 25° C. The emulsifier used is an alkylsulphonate.

EXAMPLE 1

Eight parts of a polycarbonate from 3,100 parts 2,2-(4,4'-dihydroxydiphenyl)-propane and 445 parts 2,2-(3,3'-diallyl-4,4'-dihydroxydiphenyl)-propane with a relative viscosity of 1,288 are dissolved in 54 parts methylene chloride and emulsified together with 32 parts styrene in 260 parts of water containing 1.117 parts $KH_2PO_4$, 0.406 parts $Na_2HPO_4 \cdot 12H_2O$ and 1.6 parts of emulsifier. 1.0 part of potassium persulphate dissolved in 10 parts of water are added. The emulsion is rinsed with nitrogen for 20 minutes in a polymerization vessel made of glass and fitted with stirrer, thermometer, reflux condenser and gas feed tube, heated on a water bath (bath temperature 45°–48° C) for three hours while nitrogen is passed over, and then added dropwise with stirring to 700 parts methanol. The precipitate is filtered off with suction and dried. There are obtained 34.5 parts of a polymer which has a relative viscosity of 3.365.

EXAMPLE 2

Eight parts of the polycarbonate of Example 1 are dissolved in 54 parts methylene chloride and emulsified together with 32 parts styrene in 260 parts of water containing 1.117 parts $KH_2PO_4$, 0.406 parts $Na_2HPO_4 \cdot 12 H_2O$ and 1.6 parts of emulsifier. The methylene chloride is then distilled off in a vacuum at room temperature, the emulsion remaining stable. 1.0 part of potassium persulphate dissolved in 10 parts of water are added to this emulsion. The emulsion is rinsed with nitrogen for 20 minutes in a polymerization vessel fitted with stirrer, thermometer, reflux condenser and gas feed tube, heated on a water bath (bath temperature 45°–48° C) for three hours while nitrogen is passed over, and then added dropwise with stirring to 700 parts methanol. The precipitate is filtered off with suction and dried. There are obtained 28.5 parts of a polymer which has a relative viscosity of 4.182.

EXAMPLE 3

Eight parts of the polycarbonate of Example 1 are dissolved in 54 parts methylene chloride and emulsified together with 32 parts styrene in 260 parts of water containing 1.117 parts $KH_2PO_4$, 0.406 parts $Na_2HPO_4 \cdot 12H_2O$ and 1.6 parts of emulsifier. 1.0 part of potassium persulphate dissolved in 10 parts of water are added. The emulsion is rinsed with nitrogen for 20 minutes in a polymerization vessel made of glass and fitted with stirrer, thermometer, reflex condenser and gas feed tube, and mixed with 0.459 parts of sodium thiosulphate dissolved in 10 parts of water. The emulsion is heated on a water bath at 35° C for five hours, while nitrogen is passed over, and then added dropwise with stirring to 700 parts of methanol. The precipitate is filtered off with suction and dried. There are obtained 33.5 parts of a polymer which has a relative viscosity of 2.309.

EXAMPLE 4

Forty-eight parts of the polycarbonate of Example 1 are dissolved in 358 parts methylene chloride and emulsified together with 159 parts styrene, 33 parts acrylonitrile and 0.15 parts bis-[isopropoxythioformyl]-disulphide in 1750 parts of water containing 6.7 parts $KH_2PO_4$, 2.44 parts $Na_2HPO_4$. $12H_2O$ and 9.6 parts of emulsifier and mixed with 3 parts of potassium persulphate dissolved in 20 parts of water. The emulsion is rinsed with nitrogen for 30 minutes in a polymerization vessel made of glass and fitted with stirrer, thermometer, reflex condenser and gas feed tube. 2.75 parts of sodium thiosulphate dissolved in 20 parts of water are then added. The emulsion is heated on a water bath at 35° C for four hours, while nitrogen is passed over, and then added dropwise with stirring to 3,600 parts methanol. The resultant precipitate is filtered off with suction and dried. There are obtained 224 parts of a polymer which has a relative viscosity of 1.653.

EXAMPLE 5

Eight parts of the polycarbonate of Example 1 are dissolved in 54 parts methylene chloride chloride and emulsified together with 28 parts styrene in 260 parts of water containing 1.170 parts $KH_2PO_4$, 0.406 parts $Na_2HPO_4$, 1.6 parts of emulsifier and 4 parts maleic acid, and mixed with 1.0 parts of potassium persulphate dissolved in 10 parts of water. The emulsion is rinsed with nitrogen for 20 minutes in a polymerization vessel fitted with stirrer, thermometer, reflex condenser and gas feed tube, heated on a water bath (bath temperature 45°–48° C) for 3 hours and then added dropwise with stirring to 700 parts methanol. The resultant precipitate is filtered off with suction and dried. There are obtained 17.6 parts of a polymer which has a relative viscosity of 1.328.

EXAMPLE 6

Eight parts of the polycarbonate of Example 1 are dissolved in 54 parts methylene chloride and emulsified together with 32 parts vinyl acetate in 260 parts of water containing 1.170 parts $KH_2PO_4$, 0.406 parts $Na_2HPO_4$. $12 H_2O$ and 1.6 parts of emulsifier, and mixed with 1 part of potassium persulphate dissolved in 10 parts of water. The emulsion is rinsed with nitrogen for 20 minutes in a polymerization vessel fitted with stirrer, thermometer, reflex condenser and gas feed tube, heated on a water bath (bath temperature 45°–48 ° C) for 3 hours, and then added dropwise with stirring to 700 parts methanol. 200 parts of water are subsequently added. The resultant precipitate is filtered off with suction and dried. There are obtained 18.2 parts of a polymer which has a relative viscosity of 1,579.

EXAMPLE 7

Eight parts of a polycarbonate of Example 1 are dissolved in 54 parts methylene chloride and emulsified together with 24 parts ethyl acrylate in 260 parts of water containing 1.17 parts $KH_2 PO_4$, 0.406 parts $Na_2HPO_4$ .12 $H_2O$, 1.6 parts of emulsifier and 8 parts acrylamide, and mixed with 1 part potassium persulphate dissolved in 10 parts of water. The emulsion is rinsed with nitrogen for 20 minutes in a polymerization vessel fitted with stirrer, thermometer, reflux condenser and gas feed tube, heated on a water bath (bath temperature 45°–48° C) for three hours and then added dropwise to 700 parts methanol. The resultant precipitate is filtered off with suction and dried. 37.2 parts of polymer are obtained.

EXAMPLE 8

Eight parts of polycarbonate from 3265 parts 2 2,2-(4,4'-dihydroxydiphenyl)-propane and 223 parts 2,2-(3,3'-diallyl-4,4'-dihydroxydiphenyl)-propane with a relative viscosity of 1.357 are dissolved in 54 parts of methylene chloride and emulsified together with 32 parts styrene in 260 parts of water containing 1.17 parts $KH_2PO_4$, 0,406 parts $Na_2HPO_4$. 12 $H_2 O$ and 1.6 parts of emulsifier, and mixed with 0.5 parts potassium persulphate dissolved in 10 parts of water. The emulsion is rinsed with nitrogen for 20 minutes in a polymerization vessel fitted with stirrer, thermometer, reflux condenser and gas feed tube, heated on a water bath (bath temperature 45°–48° C) for three hours and then added dropwise to 700 parts methanol. The resultant precipitate is filtered off with suction and dried. There are obtained 33 parts of a polymer with a relative viscosity of 5.556.

EXAMPLE 9

Eight parts of the polycarbonate of Example 8 are dissolved in 54 parts methylene chloride and emulsified together with 26.5 parts styrene and 5.5 parts acrylonitrile in 260 parts of water containing 1.17 parts $KH_2PO_4$, 0.406 parts $Na_2 HPO_4$ .12 $H_2 O$ and 1.6 parts of emulsifier, and mixed with 0.5 parts of potassium persulphate dissolved in 10 parts of water. The emulsion is rinsed with nitrogen for 20 minutes in a polymerization vessel fitted with stirrer, thermometer, reflux condenser and gas feed tube, heated on a water bath (bath temperature 45°–48° C) for three hours and then added dropwise to 700 parts methanol. The resultant precipitate is filtered off with suction and dried. There are obtained 30.3 parts of a polymer with a relative viscosity of 5.027.

EXAMPLE 10

Eight parts of a polycarbonate from 3364 parts 2,2-(4,4'-dihydroxxydiphenyl)-propane and 89 parts 2,2-(3,3'-diallyl-4,4'-dihydroxydiphenyl -propane with a relative viscosity of 1.350 are dissolved in 54 parts methylene chloride and emulsified together with 32 parts styrene in 260 parts of water containing 1.17 parts $KH_2 PO_4$, 0.406 parts $Na_2 HPO_4$. 12 $H_2O$ and 1.6 parts of emulsifier, and mixed with 0.5 parts of potassium persulphate dissolved in 10 parts of water. The emulsion is rinsed with nitrogen for 20 minutes in a polymerization vessel fitted with stirrer, thermometer, reflux condenser and gas feed tube, heated on a water bath (bath temperature 45°–48° C) for three hours, and then added dropwise to 600 parts methanol. The resultant precipitate is filtered off with suction and dried. There are obtained 27 parts of a polymer with a relative viscosity of 4.502.

EXAMPLE 11

Eight parts of the polycarbonate of Example 10 are dissolved in 54 parts methylene chloride and emulsified together with 26.5 parts styrene and 5.5 parts acrylonitrile in 260 parts of water containing 1.17 parts $KH_2PO_4$, 0.406 parts $Na_2HPO_4$. 12 $H_2O$ and 1.6 parts of emulsifier, and mixed with 0.5 parts of potassium persulphate dissolved in 10 parts of water. The emulsion is rinsed with nitrogen for 20 minutes in a polymerization vessel fitted with stirrer, Thermometer, reflux condenser and gas feed tube, heated on a water bath (bath temperature 45°–48° C) for 3 hours and then added dropwise with stirring to 600 parts methanol. The resultant precipitate is filtered off with suction and dried. There are obtained 34.2 parts of a polymer with a relative viscosity of 6.084.

EXAMPLE 12

Into a reaction vessel provided with reflux condenser, dropping funnel and stirrer there are filled 750 parts by volume of an aqueous dispersion of 1.5 parts of polyvinyl acetate saponified to 98 percent and 4.5 parts of magnesium hydroxide and 100 parts of a 25 percent solution in methylene chloride of the polycarbonate as described in Example 1, having a relative viscosity of 1.286, under the addition of 58.5 parts of styrene, 16.5 parts of acrylonitrile and 2 parts of benzoyl peroxide. The number of revolutions of the stirrer amounts to 270 per minute. The suspension of the organic phase in the aqueous phase is heated to 70° C for 5 hours. The polymer pearls thus obtained are washed with methanol and dried. One obtains 84 parts of a soluble pearl-polymerizate having a relative viscosity of 1.309.

EXAMPLE 13

26.2 parts of the polycarbonate of Example 1 are dissolved in 240 parts ethylene chloride and mixed with 41.6 parts styrene. The clear solution is rinsed with nitrogen for 30 minutes and, after the addition of 0.5 parts benzoyl peroxide, heated at 80° C. for 10 ½ hours, and then added dropwise with stirring to 1000 parts methanol. The resultant precipitate is filtered off with suction and dried. There are obtained 39.4 parts of a polymer with a relative viscosity if 1.258.

EXAMPLE 14

A graft polymerizate is produced by dissolving 66 parts of the polycarbonate as described in Example 1 having a relative viscosity of 1.176, and 33 parts of methylmethacrylate in 230 parts of chlorobenzene under the addition of 0.1 parts of azodiisobutyronitrile and heating the solution at 80° C. for 10 hours. After precipitating the product with methanol, separating and drying there are obtained 86 parts of a soluble polymer having a relative viscosity of 1.253.

EXAMPLE 15

Similar as described in Example 14 a solution is prepared from 70 parts of the polycarbonate of Example 1 having a relative viscosity of 1.286, 21 parts of styrene and 9 parts of acrylonitrile in 230 parts of chlorobenzene under the addition of 0.2 of azodiisobutyronitrile and treated the solution as mentioned above. After the evaporation of the solvent there remain 96 parts of a soluble transparent graft polymer having a relative viscosity of 1.708.

What is claimed is:

1. A high molecular weight branched thermoplastic polymer having a solubility of 10 g in 100 g methylene chloride at a temperature of 25° C which comprises the product obtained by graft polymerizing (1) a linear polycarbonate polymer containing radicals derived by removal of the hydroxyl hydrogens from beta-alkenyl substituted dihydric phenols, alkenyloxy carbonyl substituted dihydric phenols or beta-alkenyl esters of bis(hydroxyphenyl)alkanoic acids as unsaturated groups dissolved in an inert solvent or dispersed in a non-solvent therefor and (2) a vinyl monomer.

2. The high molecular weight polymer of Claim 1 wherein the polycarbonate polymer contains radicals of vinyl or $\beta$-alkenyl esters of bis(hydroxyphenyl)alkanoic acids.

3. The high molecular weight polymer of claim 1 wherein the polycarbonate polymer contains less than 50 mol per cent of radicals of dihydroxy compounds containing the unsaturated groups based on the total of the radicals of the dihydroxy compounds in the polycarbonate.

4. The high molecular weight polymer of claim 3 wherein the polycarbonate polymer contains less than 15 mol per cent of the radicals of dihydroxy compounds containing the unsaturated groups based on the total of the radicals of the dihydroxy compounds in the polycarbonate.

5. The high molecular weight polymer of claim 1 wherein the graft polymerization product contains polyvinyl chains.

6. The high molecular weight polymer of claim 5 wherein the graft polymerization product contains polystyrene chains.

7. The high molecular weight polymer of claim 1 wherein the average molecular weight of the polycarbonate polymer is form about 5,000 to about 1000,000.

8. The high molecular weight polymer of claim 1 wherein the average molecular weight of the polycarbonate polymer is from about 10,000 to about 70,000.

9. The high molecular weight polymer of claim 1 wherein the average molecular of the graft polymerized chain of the vinyl monomer is from about 1,000 to about 100,000.

10. The high molecular weight polymer of claim 1 wherein the average molecular weight of the graft polymerized chain of vinyl monomer is from about 5,000 to about 50,000.

11. The high molecular weight polymer of claim 1 wherein the polycarbonate polymer contains $\beta$-alkenyl radicals.

12. The high molecular weight polymer of claim 1 wherein the polycarbonate polymer contains repeating radicals derived from 2,2-(3,3'-diallyl-4,4'-dihydroxydiphenyl)propane.

13. The high molecular weight polymer of claim 1 wherein the b-alkenyl group contains three carbon atoms.

14. The high molecular weight polymer of claim 1 wherein the b-alkenyl group contains four carbon atoms.

15. A process for the production of high molecular weight branched thermoplastic polymers having a solubility of 10 g in 100 g methylene chloride at a temperature of 25° C which comprises reacting the polymerizable groups of a linear polycarbonate polymer containing $\beta$-alkenyl radicals, $\beta$-alkenyl carboxylate radicals or the radicals of vinyl or $\beta$-alkenyl esters of bis(hydroxyphenyl)alkanoic acids as unsaturated polymerizable groups with a vinyl monomer under graft polymerization conditions while the polycarbonate polymer is dissolved in an inert solvent or dispersed in a non-solvent therefor.

16. The process of claim 15 wherein the polycarbonate polymer contains radicals of vinyl or $\beta$-alkenyl esters of bis-(hydroxyphenyl)alkanoic acids.

17. The process of claim 15 wherein the polycarbonate polymer contains less than 50 mol per cent of radicals of dihydroxy cmpounds containing the unsaturated polymerizable groups based on the total of the radicals of the dihydroxy compounds in the polycarbonate.

18. The process of claim 15 wherein the polycarbonate polymer contains less than 15 mol per cent of radicals of dihydroxy compounds containing the unsaturated polymerizable groups based on the total of the radicals of the dihydroxy compounds in the polycarbonate.

19. The process of claim 15 wherein the polymerizable groups of the polycarbonate polymer are reacted with a vinyl monomer.

20. The process of claim 15 wherein the polycarbonate polymer contains radicals derived by the removal of the hydroxyl hydrogen from b-alkenyl substituted dihydric phenols.

21. The process of claim 15 wherein the polycarbonate polymer contains repeating radicals derived by the removal of the hydroxyl hydrogen from 2,2-(3,3'-diallyl-4,4'-dihydroxydiphenyl)propane.

22. The process of claim 15 wherein the polymerization is initiated by the addition of a free radical forming catalyst.

* * * * *